US008736559B2

(12) United States Patent
Pertuit et al.

(10) Patent No.: US 8,736,559 B2
(45) Date of Patent: May 27, 2014

(54) PORTABLE ELECTRONIC DEVICE AND METHOD OF CONTROLLING SAME

(75) Inventors: Michael Joseph Pertuit, Irving, TX (US); Richard James Brogle, Irving, TX (US); Kuo-Feng Tong, Waterloo (CA); Adam Louis Parco, Waterloo (CA)

(73) Assignee: BlackBerry Limited, Waterloo (CA)

( * ) Notice: Subject to any disclaimer, the term of this patent is extended or adjusted under 35 U.S.C. 154(b) by 835 days.

(21) Appl. No.: 12/766,019

(22) Filed: Apr. 23, 2010

(65) Prior Publication Data

US 2011/0260983 A1 Oct. 27, 2011

(51) Int. Cl.
*G06F 3/041* (2006.01)

(52) U.S. Cl.
USPC .......................................... 345/173; 345/174

(58) Field of Classification Search
USPC .................................................. 345/173–179
See application file for complete search history.

(56) References Cited

U.S. PATENT DOCUMENTS

| 6,342,880 B2* | 1/2002 | Rosenberg et al. ............ 345/161 |
| 2001/0039484 A1* | 11/2001 | Freudenberg et al. ......... 702/115 |
| 2006/0028095 A1 | 2/2006 | Maruyama et al. |
| 2006/0146036 A1* | 7/2006 | Prados et al. .................. 345/173 |
| 2008/0231594 A1* | 9/2008 | Hardwick et al. ............. 345/156 |
| 2008/0303784 A1* | 12/2008 | Yamaguchi et al. ........... 345/156 |
| 2009/0002325 A1* | 1/2009 | Jha et al. ....................... 345/173 |
| 2009/0289779 A1* | 11/2009 | Braun et al. ................ 340/407.2 |
| 2009/0315835 A1 | 12/2009 | De Goes |
| 2010/0045624 A1* | 2/2010 | Hisatsugu et al. ............. 345/173 |
| 2010/0097336 A1 | 4/2010 | Gomes |
| 2010/0156814 A1* | 6/2010 | Weber et al. .................. 345/173 |
| 2010/0177057 A1* | 7/2010 | Flint et al. ..................... 345/174 |
| 2011/0084910 A1* | 4/2011 | Almalki et al. ............... 345/173 |
| 2011/0141052 A1* | 6/2011 | Bernstein et al. ............. 345/174 |
| 2011/0248929 A1* | 10/2011 | Tong et al. .................... 345/173 |
| 2011/0291950 A1* | 12/2011 | Tong ............................. 345/173 |
| 2011/0291951 A1* | 12/2011 | Tong ............................. 345/173 |

FOREIGN PATENT DOCUMENTS

| CA | 2731042 A1 | 1/2010 |
| EP | 0528598 A2 | 2/1993 |
| EP | 0640936 A1 | 3/1995 |
| WO | 2008009687 A2 | 1/2008 |

OTHER PUBLICATIONS

Extended European Search Report; EP 10160877.6; dated Oct. 4, 2010.
Office Action mailed May 14, 2013, in corresponding Canadian patent application No. 2,736,852.

* cited by examiner

*Primary Examiner* — Alexander Eisen
*Assistant Examiner* — Nelson Lam
(74) *Attorney, Agent, or Firm* — Novak Druce Connolly Bove + Quigg LLP

(57) ABSTRACT

A method includes determining first respective values representative of forces applied by a plurality of actuators to a touch-sensitive input device of an electronic device, controlling the actuators to cause the actuators to change the forces applied to the touch-sensitive input device, determining second respective values representative of the forces applied by the actuators to the touch-sensitive input device, and determining when there is a fault based on a change from the first respective values to the second respective values.

19 Claims, 7 Drawing Sheets

PORTABLE ELECTRONIC DEVICE AND METHOD OF CONTROLLING SAME

FIELD OF TECHNOLOGY

The present disclosure relates to portable electronic devices, including but not limited to portable electronic devices having touch screen displays and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, wireless PDAs, and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

The inclusion of force sensors, optionally complementing a touch-sensitive display, facilitates further functions and operations of the device.

BRIEF DESCRIPTION OF THE DRAWINGS

Embodiments of the present disclosure will now be described, by way of example only, with reference to the attached Figures, wherein.

DETAILED DESCRIPTION

Figure 1:
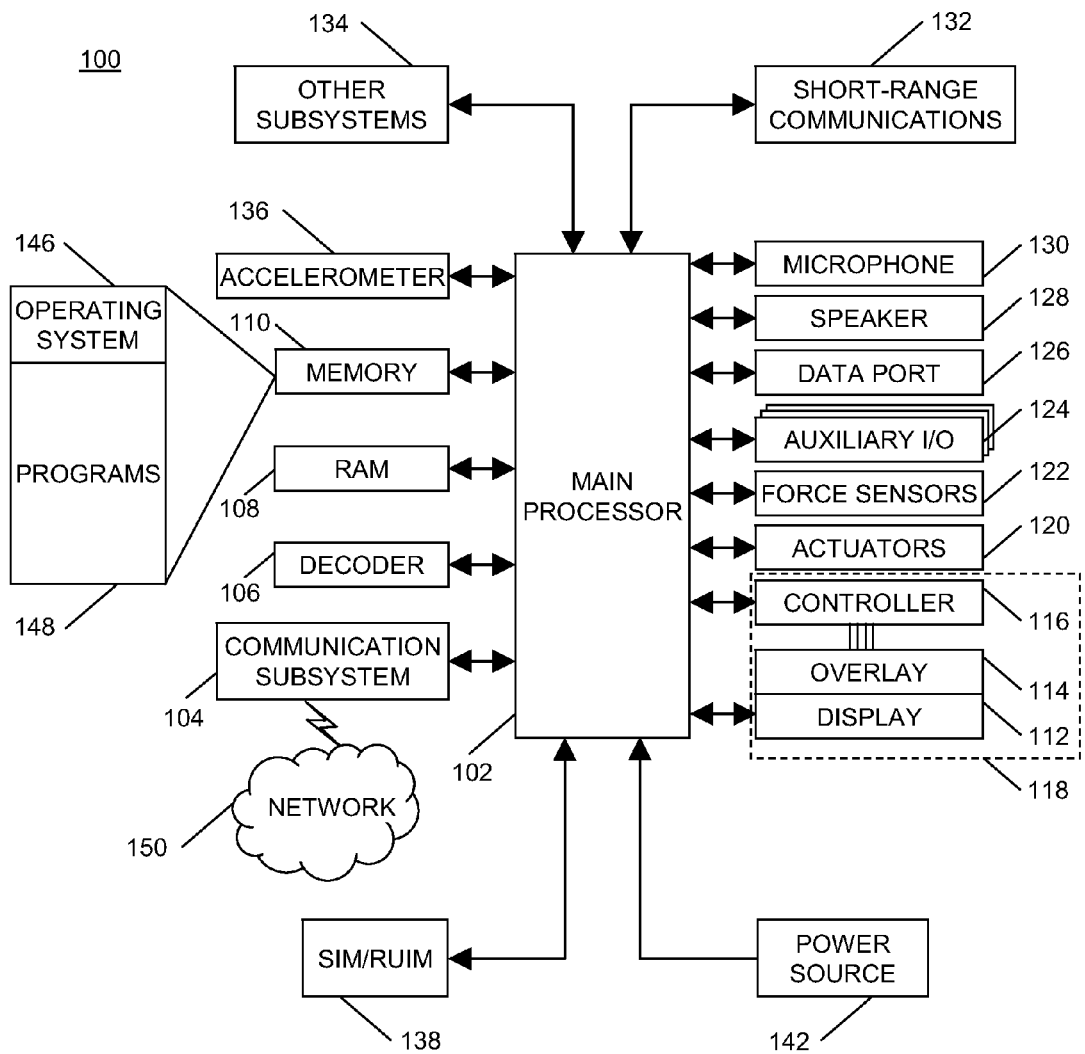
FIG. 1 is a block diagram of a portable electronic device in accordance with an example embodiment.

The following describes an electronic device and a method including determining first respective values representative of forces applied by a plurality of actuators to a touch-sensitive input device of an electronic device, controlling the actuators to cause the actuators to change the forces applied to the touch-sensitive input device, determining second respective values representative of the forces applied by the actuators to the touch-sensitive input device, and determining when there is a fault at least one of the actuators based on a change from the first respective values to the second respective values.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limited to the scope of the example embodiments described herein.

Tactile feedback is provided by movement of the touch-sensitive display, relative to a back of the portable electronic device, utilizing a plurality of actuators between the back and the touch-sensitive display. Missing or faulty actuators that fail to actuate or fail to actuate in a predictable manner may adversely affect tactile feedback that is provided. Such missing or faulty actuators may be difficult to detect or determine, however. The comparison of force values before and after changing the forces applied by the actuators facilitates detection of missing or faulty actuators. The results of the comparison may be reported by offloading the information or at the portable electronic device. Such a report may be, for example, a visual indication on the touch-sensitive display to identify the location of the missing or faulty actuator or actuators. Such feedback facilitates identification of problems, for example, during manufacture of the portable electronic device.

The disclosure generally relates to an electronic device, which in the embodiments described herein is a portable electronic device. Examples of portable electronic devices include mobile, or handheld, wireless communication devices such as pagers, cellular phones, cellular smart-phones, wireless organizers, personal digital assistants, wirelessly enabled notebook computers, and the like. The portable electronic device may also be a portable electronic device without wireless communication capabilities such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and dual-mode networks that support both voice and data communications. A power source 142, such as one or more rechargeable batteries or a port to another power supply, powers the portable electronic device 100.

The processor 102 interacts with other devices, such as a Random Access Memory (RAM) 108, memory 110, a display 112 with a touch-sensitive overlay 114 operably connected to an electronic controller 116 that together comprise a touch-sensitive display 118, actuators 120, force sensors 122, an auxiliary input/output (I/O) subsystem 124, a data port 126, a speaker 128, a microphone 130, short-range communications 132 and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, links, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into the memory 110.

The portable electronic device 100 also includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, or surface acoustic wave (SAW) touch-sensitive display, as known in the art. A capacitive touch-sensitive display includes the display 112 and a capacitive touch-sensitive overlay 114. The overlay 114 may be an assembly of multiple layers in a stack including, for example, a substrate, LCD display 112, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

The actuators 120 may be actuated, for example, by applying sufficient force to the touch-sensitive display 118 to overcome the actuation force of the actuators 120. The actuators 120 may be actuated by pressing anywhere on the touch-sensitive display 118. Input may be provided to the processor 102 when the actuators are actuated. Actuation of the actuators 120 provides the user with tactile feedback.

Figure 2:
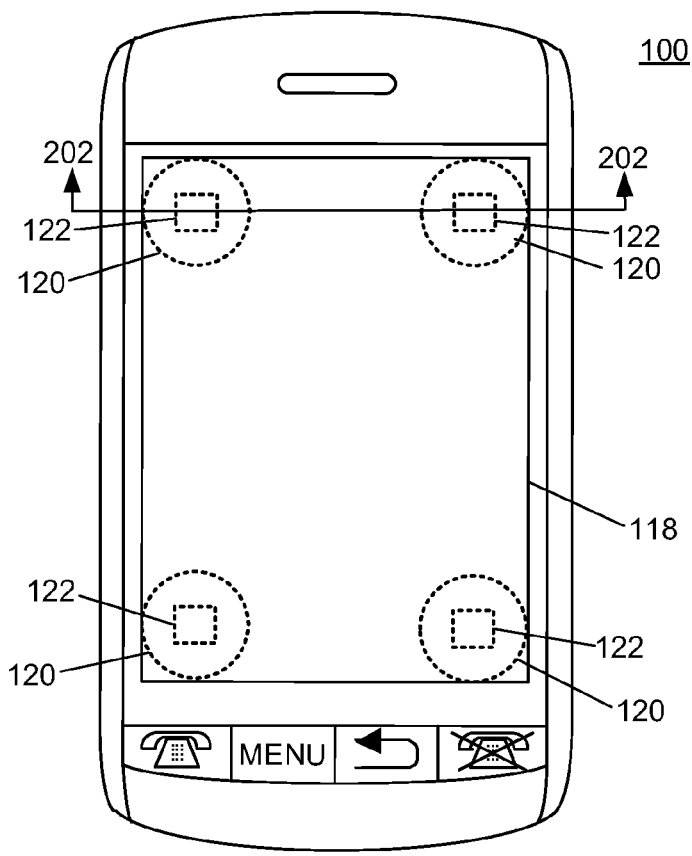
FIG. 2 illustrates a front view of a portable electronic device in accordance with an example embodiment.
Figure 3:
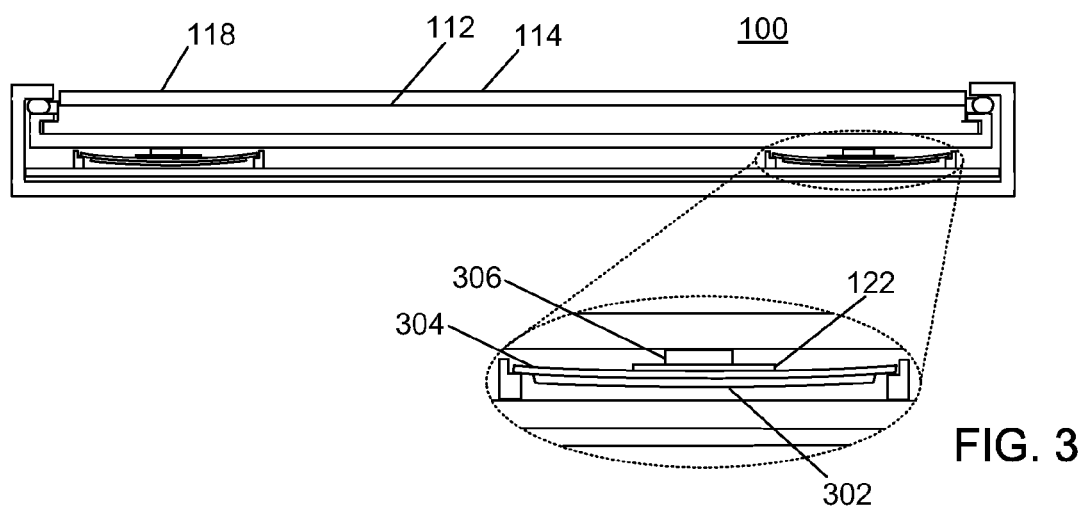
FIG. 3 illustrates a cross-sectional view through the line 202 of FIG. 2.

The actuators 120 may comprise any suitable number of, for example, piezoelectric (piezo) actuators that provide tactile feedback. FIG. 2 is a front view of an example of a portable electronic device 100. In the example shown in FIG. 2, the actuators 120 comprise four piezo actuators 120, each located near a respective corner of the touch-sensitive display 118. FIG. 3 is a sectional side view of the portable electronic device 100 through the line 202 of FIG. 2. Each piezo actuator 120 is supported within the portable electronic device 100 such that contraction of the piezo actuators 120 applies a force against the touch-sensitive display 118, opposing a force externally applied to the display 118. Each piezo actuator 120 includes a piezoelectric device 302, such as a piezoelectric disk adhered to a metal substrate 304. An element 306 that is advantageously at least partially flexible and comprises, for example, hard rubber is located between the disk 302 and the touch-sensitive display 118. The element 306 does not substantially dampen the force applied to or on the touch-sensitive display 118. In the example shown in FIG. 2 and FIG. 3, the force sensors 122 comprise four force-sensors 122, each force sensor located between an element 306 and the metal substrate 304. The force sensors 122 are utilized to determine a value related to the force at each of the force sensors 122 when an external force is applied to the touch-sensitive display 118. The force sensors 122 are also utilized to determine values representative of the force, at the force sensors 122, applied by the piezo actuators 120. Thus, each force sensor is utilized to determine a value representative of the force applied by the respective piezo actuator 120 on the touch-sensitive display 118.

The metal substrate 304 bends when the piezoelectric device 302 contracts diametrically due to build up of charge at the piezoelectric device 302 or in response to an external force applied to the touch-sensitive display 118. The charge may be adjusted by varying the applied voltage or current, thereby controlling the forces applied by the piezo actuators 120 on the force sensors 122 and the touch-sensitive display 118. The charge on the piezo actuators 120 may be removed by a controlled discharge current that causes the piezoelectric devices 302 to expand diametrically, decreasing the force applied by the piezo actuators 120 on the force sensors 122 and the touch-sensitive display 118. Absent an external force applied to the touch-sensitive display 118 and absent a charge on the piezoelectric device 302, the piezo actuators 120 may be slightly bent due to a mechanical preload. Thus, forces may be applied to each of the force sensors 122, absent actuation of the piezo actuators 120 and absent an external applied force on the touch-sensitive display 118, due to the mechanical preload.

Figure 4:
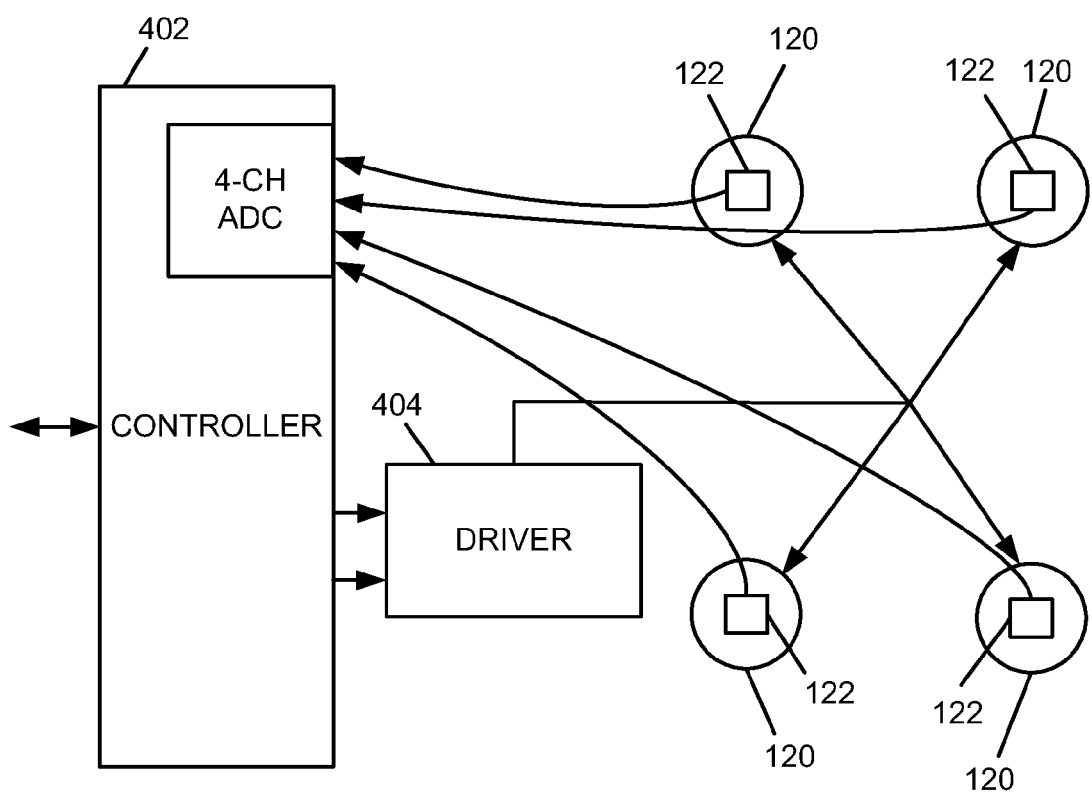
FIG. 4 is a functional block diagram showing components of the portable electronic device in accordance with an example embodiment.

A functional block diagram of components of the portable electronic device 100 is shown in FIG. 4. In this example, each force sensor 122 is connected to a controller 402, which includes an amplifier and analog-to-digital converter (ADC). The force sensors 122 may be, for example, force-sensing resistors in an electrical circuit such that the resistance changes with force applied to the force sensors 122. As applied force on the touch-sensitive display 118 increases, the resistance decreases. This change is determined via the controller 116 for each of the force sensors 122, and a value representative of the force (i.e., the resistance) at each of the force sensors 122 is determined.

The actuators 120 are connected to a driver 404, which in the present example is a piezo driver that communicates with the controller 402. The controller 402 is also in communication with the main processor 102 of the portable electronic device 100 and may receive and provide signals to and from the main processor 102. The piezo actuators 120 and the force sensors 122 are operatively connected to the main processor 102 via the controller 402. The controller 402 controls the driver 404 that controls the current or voltage to the piezoelectric devices 302 and thus controls the charge and the force applied by the piezo actuators 120 on the touch-sensitive display 118. Each of the piezoelectric devices 302 may be controlled substantially equally and concurrently. Optionally, the piezoelectric devices 302 may be controlled separately. Tactile feedback is provided by controlling the piezoelectric devices 302 to, for example, simulate switches, actuators, keys or provide other feedback. For example, when an applied force, on the touch-sensitive display 118, exceeds a depression threshold, the charge at the piezo actuators 120 is modulated to impart a force on the touch-sensitive display 118 to simulate depression of a dome switch. When the applied force, on the touch-sensitive display 118, falls below a release threshold, after simulation of depression of a dome switch, the charge at the piezo actuators 120 is modulated to impart a force, by the piezo actuators 120, to simulate release of a dome switch.

Figure 5:
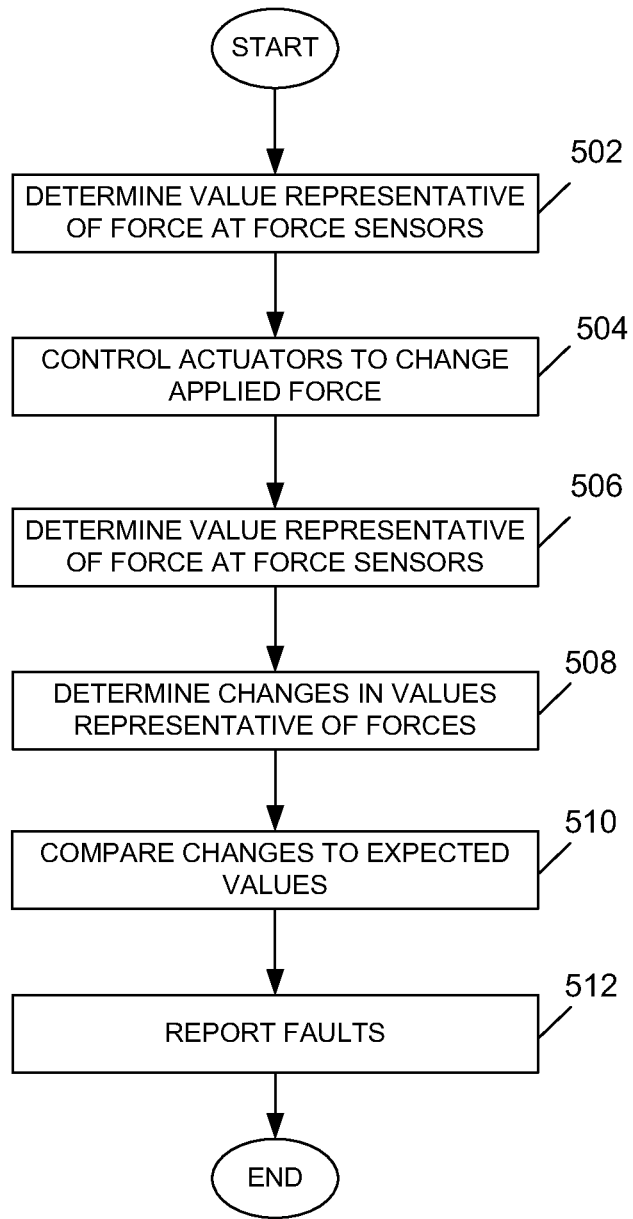
FIG. 5 is a flow chart illustrating a method of controlling a portable electronic device in accordance with an example embodiment.

A flowchart illustrating a method of testing the electronic device 100 is shown in FIG. 5. The method may be carried out by software executed by, for example, the processor 102. Coding of software for carrying out such a method is within the scope of a person of ordinary skill in the art given the present description. The method illustrated in FIG. 5 may be carried out during manufacture of the portable electronic device 100 to test the actuators 120 and force sensors 122 or may carried out at any other suitable time. Optionally, the method may be carried out in response to selection of an option to test the actuators 120 and force sensors 122.

The value representative of force at each of the force sensors 122 is determined 502 based on signals from the force sensors 122. As described above, the resistance value is representative of the force at the respective force sensor 122.

The actuators 120 are controlled 504 to change the force applied to the touch-sensitive display 118, and therefore to the force sensors 122. When the force is changed, the value representative of force at each of the force sensors 122 is again determined 506 based on signals from the force sensors 122. For each of the force sensors 122, the change in value representative of force from the value determined at 502 to the value determined at 506, is determined 508. The change in value representative of force at each of the force sensors 122 is compared 510 to an expected value to determine whether or not there is a fault with the respective actuator 120 or force sensor 122. Any fault is reported 512.

Continued reference is made to FIG. 5 to describe one example of the method of testing the electronic device 100. According to this example, the method is carried out during manufacture of the portable electronic device 100.

The value representative of force at each of the force sensors 122 is determined 502 absent an external force on the touch-sensitive display 100 and when the actuators 120 are not charged. The resistance value at each of the force sensors 122 is representative of the force at the respective force sensor 122 and, in this example, is a result of the mechanical preload only.

The actuators 120 are controlled 504 by applying a voltage to the actuators 120 to charge the actuators 120 and apply a force to the touch-sensitive display 118. The value representative of force at each of the force sensors 122 is again determined 506 based on signals from the force sensors 122. For each force sensor 122, the change in value representative of force, from the value determined at 502 to the value determined at 506, is determined 508. The change in values is expected to represent the increase in force from the force caused by the mechanical preload only to the force applied by charging the actuators 120. Based on a comparison 510 of the change in forces to an expected value, a determination is made whether or not an actuator or actuators 120 or the respective force sensor or force sensors 122 are faulty or missing. Any faults are reported 512. For example, when the change in the value representative of force, determined from one of the force sensors 122, differs from the expected change by a threshold amount, a fault is determined at the corresponding actuator 120 or force sensor 122. Alternatively when the change in value representative of force, determined from one of the force sensors 122, does not represent an increase in force, or represents an increase in force that is less than a threshold amount, a fault is determined at the corresponding actuator 120 or force sensor 122. The results are reported 512 in a suitable manner. For example, the results may be stored on the portable electronic device 100 for offloading or may be sent to another electronic device for displaying results. Alternatively, the touch-sensitive display 118 may be utilized to display the results of the test. For example, the touch-sensitive display may display an indication that the actuators 120 and force sensors 122 are working or are not working, such as by displaying a colour (i.e., green) to represent that all actuators 120 and force sensors 122 are operating as expected and displaying an alternate colour (i.e., red) to represent that one or more actuators 120 or force sensors 122 are faulty. The location of a faulty actuator 120 or force sensor may also be displayed.

Figure 6:
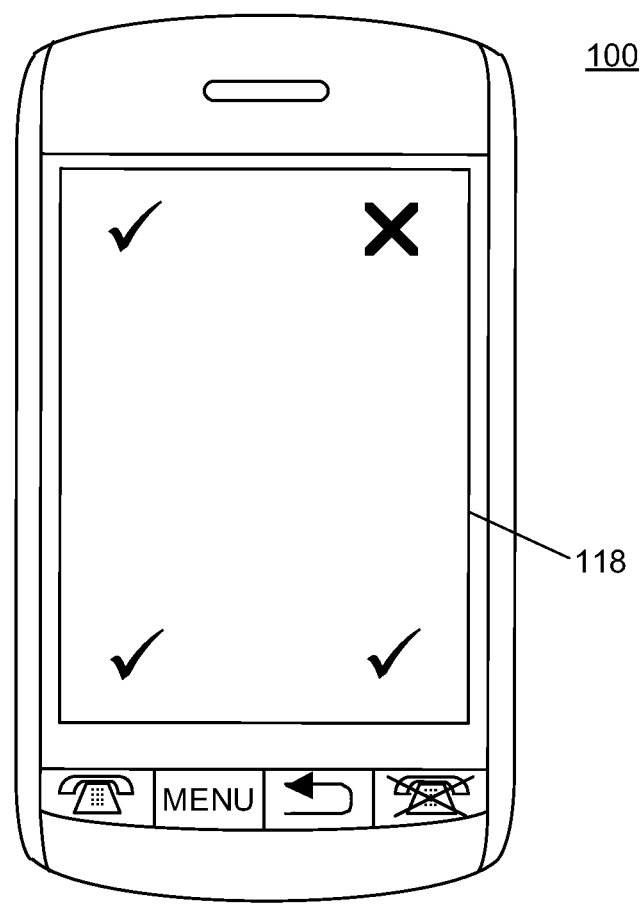
FIG. 6 illustrates an example screen shot of a portable electronic device in accordance with an example embodiment.

FIG. 6 shows an example of a screen shot of the portable electronic device 100 illustrating a location of a faulty actuator 120 or force sensor 122. In the example shown in FIG. 6, a check mark is displayed on the touch-sensitive display 118 for each actuator 120 and force sensor 122 that are operating as expected based on the values representative of the forces. An X mark is displayed for each actuator 120 or force sensor 122 that is faulty or missing. The check marks and X marks are displayed near respective corners to represent the location (s) of the faulty or missing actuator(s) 120 or force sensor(s). In the example of FIG. 6, the actuator 120 or the force sensor 122 in the upper right-hand corner, in the orientation shown, is reported as faulty or missing. The remaining actuators 120 and force sensors 122 are not faulty or missing.

Figure 7:
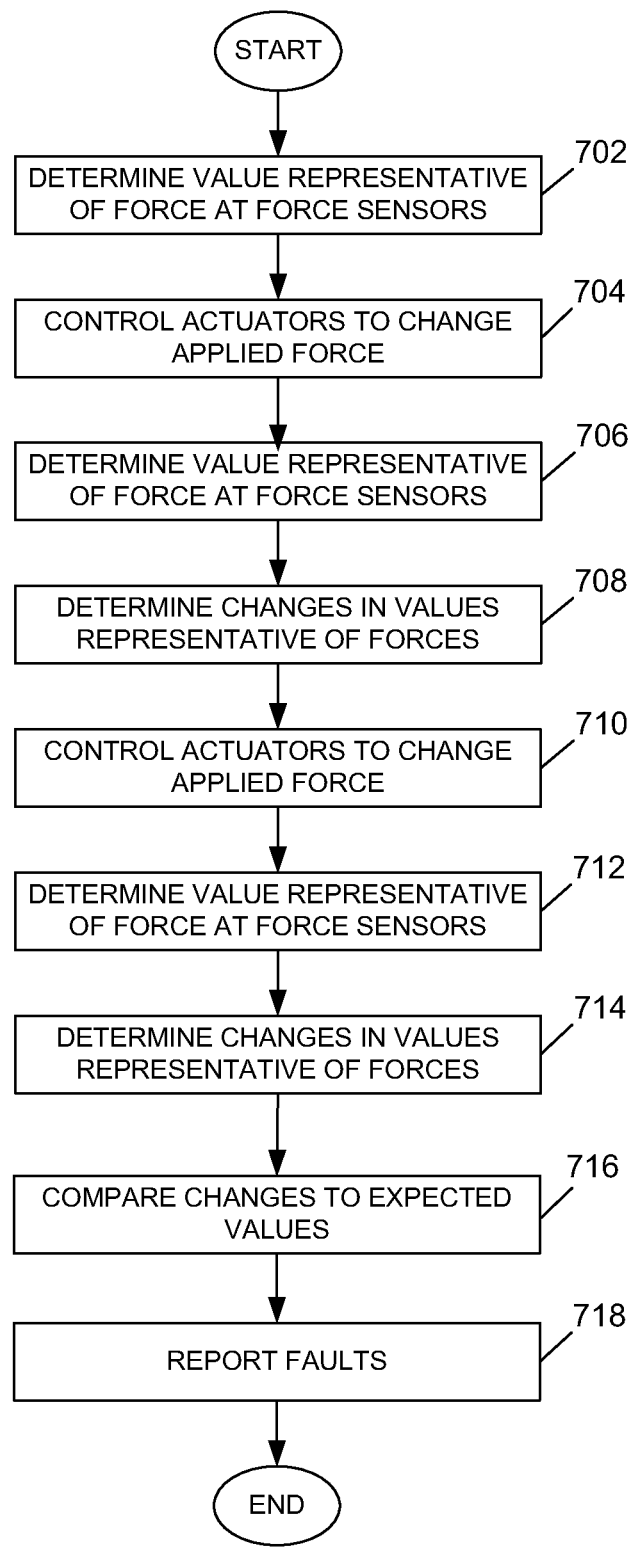
FIG. 7 is a flow chart illustrating a method of controlling a portable electronic device in accordance with another example embodiment.

A flowchart illustrating another method of testing the electronic device 100 is shown in FIG. 7. The method may be carried out by software executed by, for example, the processor 102. Coding of software for carrying out such a method is within the scope of a person of ordinary skill in the art given the present description. The method illustrated in FIG. 7 may be carried out during manufacture of the portable electronic device 100 to test the actuators 120 and force sensors 122 or may carried out at any other suitable time. Optionally, the method may be carried out in response to selection of an option to test the actuators 120 and force sensors 122.

The value representative of force at each of the force sensors 122 is determined 702 based on signals from the force sensors 122. As described above, the resistance value is representative of the force at the respective force sensor 122.

The actuators 120 are controlled 704 to change the force applied to the touch-sensitive display 118, and therefore to the force sensors 122. When the force is changed, the value representative of force at each of the force sensors 122 is again determined 706 based on signals from the force sensors 122. For each of the force sensors 122, the change in value representative of force from the value determined at 702 to the value determined at 706, is determined 708.

The actuators 120 are again controlled 710 to change the force applied to the touch-sensitive display 118, and therefore to the force sensors 122. When the force is changed, the value representative of force at each of the force sensors 122 is again determined 712 based on signals from the force sensors 122. For each of the force sensors 122, the change in value representative of force from the value determined at 708 to the value determined at 712, is determined 714.

The changes in value representative of force at each of the force sensors 122, as determined at 708 and 714, are compared 716 to expected changes to determine whether or not the respective actuator 120 or force sensor 122 is faulty or missing. Any missing or faulty actuator(s) 120 or force sensor(s) 122 are reported 718.

Continued reference is made to FIG. 7 to describe one example of the method of testing the electronic device 100. According to this example, the method is carried out during manufacture of the portable electronic device 100.

The value representative of force at each of the force sensors 122 is determined 702 absent an external force on the touch-sensitive display 100 and when the actuators 120 are not charged.

The actuators 120 are controlled 704 by applying a voltage to the actuators 120 to charge the actuators 120 and apply a force to the touch-sensitive display 118. The value representative of force at each of the force sensors 122 is again determined 706 based on signals from the force sensors 122. For each force sensor 122, the change in value representative of force, from the value determined at 702 to the value determined at 706, is determined 708.

The actuators 120 are again controlled 710 by discharging the actuators 120 to return the force to the force when the actuators are not actuated and there is no external force on the touch-sensitive display 118. The value representative of force at each of the force sensors 122 is again determined 712 based on signals from the force sensors 122. For each force sensor 122, the change in value representative of force, from the value determined at 708 to the value determined at 712, is determined 714.

The changes in values determined at 708 are expected to represent the increase in force from the force caused by the mechanical preload only to the force applied by charging the actuators 120. The changes in values determined at 714 are expected to represent the decrease in force from the force applied by the charged actuators 120 to the force caused by the mechanical preload only. Based on comparisons 716 of the changes in forces to expected values, a determination is made whether or not an actuator or actuators 120 or the corresponding force sensor 122 or force sensors 122 are faulty or missing. Any fault is reported 718.

In this example, changes in forces are determined from mechanical preload to charged actuators 120 and from charged actuators 120 to mechanical preload. Faulty or missing actuators 120 or force sensors 122 may be identified and, additionally, any debris or other material that may inhibit the decrease in force when the actuators are discharged may be detected.

Figure 8:
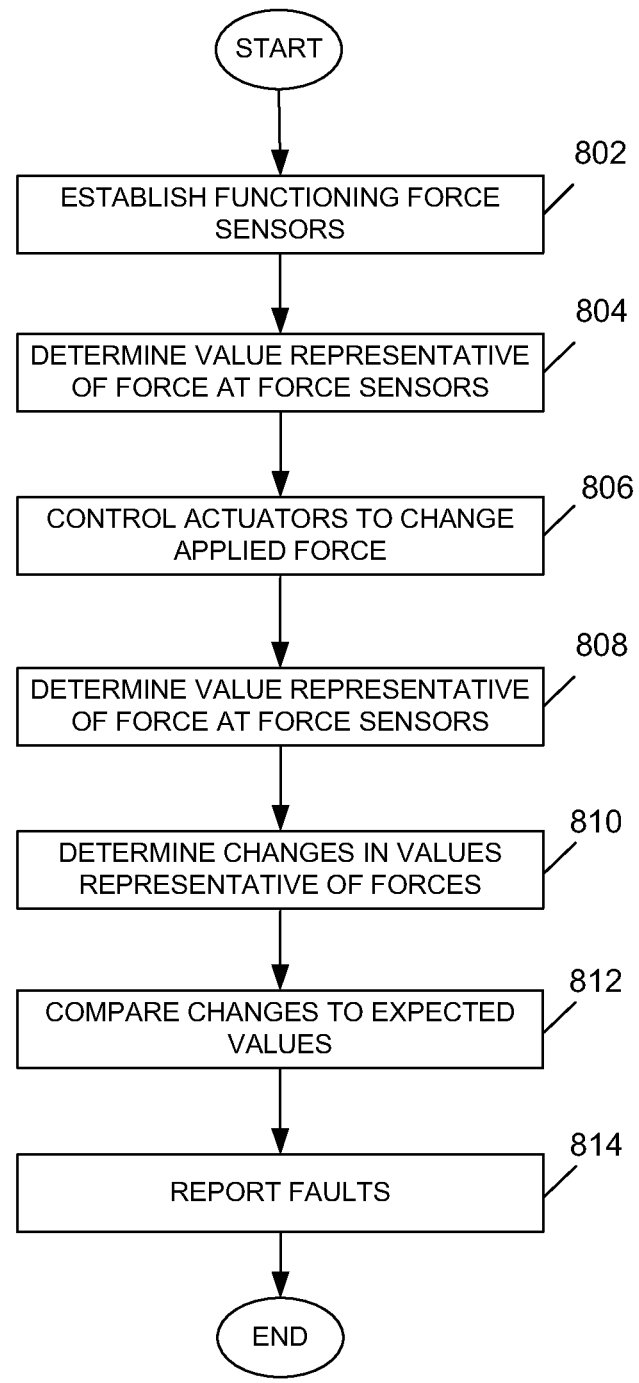
FIG. 8 is a flow chart illustrating a method of controlling a portable electronic device in accordance with another example embodiment.

A flowchart illustrating another method of testing the electronic device 100 is shown in FIG. 8. The method may be carried out by software executed by, for example, the processor 102. Coding of software for carrying out such a method is within the scope of a person of ordinary skill in the art given the present description. The method illustrated in FIG. 8 may be carried out during manufacture of the portable electronic device 100 to test the actuators 120 or may carried out at any other suitable time. Optionally, the method may be carried out in response to selection of an option to test the actuators 120.

The force sensors 122 that are functioning are established when an external force is applied to the touch-sensitive display 118. For example, the value representative of force may be determined before and during application of an external force to the touch-sensitive display 118. The external force may be applied, for example, by a machine for applying a force of known magnitude. When the value representative of force, determined from the signals from a force sensor 122, increases by an expected amount based on the magnitude of the external force, from before application of the external force to after application of the external force, functioning of the force sensor is established. Functioning of each of the force sensors 122 is therefore established.

Optionally, the externally applied force may be controlled such that multiple, forces of different known magnitudes are applied to establish that each force sensor 122 is functioning.

The remaining process is similar to that described above with reference to FIG. 5 and therefore the remainder of the process is not further described herein. In the example of FIG. 8, however, the force sensors that are functioning are established and a fault determined based on the comparison of changes at 812 may be determined to be caused by a faulty actuator 120 when the force sensor 122 has been established as functioning. Any missing or faulty actuator or actuators 120 are therefore reported at 814.

In yet a further embodiment, whether or not the force sensors 122 are functioning may be established prior to the process illustrated in FIG. 7. Therefore, a fault determined based on the comparisons of changes at 710 and 716 may be determined to be caused by a faulty actuator 120 when the force sensor 122 has been established as functioning. Any missing or faulty actuator or actuators 120 are reported at 718.

In the examples described above and shown in FIG. 1, a touch-sensitive display is utilized. The present disclosure is not limited to a touch-sensitive display, however, as any touch-sensitive input device may be utilized. A touch-sensitive input device may be a capacitive touch-sensitive input device, a resistive touch-sensitive input device, a device that is force-sensitive for detecting when a force is applied by a touch, or any other suitable device.

Tactile feedback is provided by movement of the touch-sensitive display, relative to a back of the portable electronic device, utilizing a plurality of actuators and force sensors between the back and the touch-sensitive display. Missing or faulty actuators that fail to actuate or fail to actuate in a predictable manner may adversely affect tactile feedback that is provided. Missing or faulty force sensors may also adversely affect tactile feedback. Such missing or faulty actuators or force sensors may be difficult to detect or determine, however. The comparison of force values before and after changing the forces applied by the actuators facilitates detection of missing or faulty actuators or force sensors. The results of the comparison may be reported by offloading the information or at the portable electronic device. Such a report may be, for example, a visual indication on the touch-sensitive display to identify the location of the missing or faulty actuator(s) or corresponding force sensor(s). Such feedback facilitates identification of problems, for example, during manufacture of the portable electronic device.

A method includes determining first respective values representative of forces applied by a plurality of actuators to a touch-sensitive input device of an electronic device, controlling the actuators to cause the actuators to change the forces applied to the touch-sensitive input device, determining second respective values representative of the forces applied by the actuators to the touch-sensitive input device, and determining when there is a fault based on a change from the first respective values to the second respective values.

A computer-readable medium has computer-readable code executable by at least one processor of a portable electronic device to perform the above method.

An electronic device includes a touch-sensitive display, a plurality of actuators configured to apply forces to the touch-sensitive display, force sensors configured to determine values representative of the forces applied by the plurality of actuators, and at least one processor operably connected to the touch-sensitive display, the actuators, and the force sensors and configured to carry out the above method.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method, comprising:
    determining first respective values representative of forces applied by a plurality of actuators to a touch-sensitive input device of an electronic device;
    controlling the actuators to cause the actuators to change the forces applied to the touch-sensitive input device;
    determining second respective values representative of the forces applied by the actuators to the touch-sensitive input device; and
    determining when there is a fault based on a change from the first respective values to the second respective values.

2. The method according to claim 1, wherein the electronic device comprises a plurality of force sensors, ones of the force sensors corresponding with respective ones of the actuators for detecting the first values and the second values.

3. The method according to claim 2, wherein determining comprises determining when there is a fault with at least one of the actuators and corresponding force sensors.

4. The method according to claim 1, comprising establishing that the force sensors are functioning prior to controlling the actuators and wherein determining comprises determining when there is a fault with at least one of the actuators.

5. The method according to claim 1, wherein the actuators comprise piezoelectric actuators and controlling the actuators comprises charging the actuators.

6. The method according to claim 1, wherein the actuators comprise piezoelectric actuators and controlling the actuators comprises discharging the actuators.

7. The method according to claim 1, comprising determining a location of the fault based on the change.

8. The method according to claim 7, comprising reporting the location of the fault.

9. The method according to claim 1, comprising, after detecting second respective values representative of the forces,
    further controlling the actuators to further change the force applied to the touch-sensitive input device;
    detecting third respective values representative of the forces applied by the actuators to the touch-sensitive input device; and
    determining when there is a fault based on a further change from the second respective values to the third respective values.

10. The method according to claim 9, comprising reporting results of the comparison of the second values to the third values.

11. The method according to claim 9, wherein further controlling the actuators comprises charging the actuators to increase a force applied to the touch-sensitive display.

12. The method according to claim 9, wherein further controlling the actuators comprises discharging the actuators to decrease a force applied to the touch-sensitive display.

13. The method according to claim 9, wherein determining comprises determining there is a fault when the difference between the further change and an expected change meets a threshold.

14. The method according to claim 9, wherein determining comprises determining there is a fault when the further change does not meet a threshold.

15. The method according to claim 1, wherein the touch-sensitive input device is a touch-sensitive display, and the method comprises displaying information on the touch-sensitive display to indicate a location of the fault.

16. The method according to claim 1, wherein determining comprises determining there is a fault when the difference between the change and an expected change meets a threshold.

17. The method according to claim 1, wherein determining comprises determining there is a fault when the change does not meet a threshold.

18. A non-transitory computer-readable storage device having computer-readable code executable by at least one processor of a portable electronic device to perform the method of:
    determining first respective values representative of forces applied by a plurality of actuators to a touch-sensitive input device of an electronic device;
    controlling the actuators to cause the actuators to change the forces applied to the touch-sensitive input device;
    determining second respective values representative of the forces applied by the actuators to the touch-sensitive input device; and
    determining when there is a fault based on a change from the first respective values to the second respective values.

19. An electronic device comprising:
    a touch-sensitive display;
    a plurality of actuators configured to apply forces to the touch-sensitive display;
    force sensors configured to determine values representative of the forces applied by the plurality of actuators; and
    at least one processor operably connected to the touch-sensitive display, the actuators, and the force sensors and configured to carry out the method of:
        determining first respective values representative of forces applied by a plurality of actuators to a touch-sensitive input device of an electronic device;

controlling the actuators to cause the actuators to change the forces applied to the touch-sensitive input device;

determining second respective values representative of the forces applied by the actuators to the touch-sensitive input device; and determining when there is a fault based on a change from the first respective values to the second respective values.

\* \* \* \* \*